(12) United States Patent
Hammer et al.

(10) Patent No.: US 11,268,514 B2
(45) Date of Patent: Mar. 8, 2022

(54) MOTOR VEHICLE VACUUM PUMP

(71) Applicant: PIERBURG PUMP TECHNOLOGY GMBH, Neuss (DE)

(72) Inventors: Stefan Hammer, Duesseldorf (DE); Wolfgang Pilenz, Neukirchen-Vluyn (DE); Enver Des, Neuss (DE); Stefan Sommer, Duesseldorf (DE); Moritz Johannes Job, Duesseldorf (DE)

(73) Assignee: PIERBURG PUMP TECHNOLOGY GMBH, Neuss (DE)

( * ) Notice: Subject to any disclaimer, the term of this patent is extended or adjusted under 35 U.S.C. 154(b) by 478 days.

(21) Appl. No.: 15/772,091

(22) PCT Filed: Nov. 2, 2015

(86) PCT No.: PCT/EP2015/075365
§ 371 (c)(1),
(2) Date: Apr. 30, 2018

(87) PCT Pub. No.: WO2017/076418
PCT Pub. Date: May 11, 2017

(65) Prior Publication Data
US 2018/0238331 A1  Aug. 23, 2018

(51) Int. Cl.
*F04C 29/12* (2006.01)
*F04C 25/02* (2006.01)
(Continued)

(52) U.S. Cl.
CPC ............ *F04C 29/128* (2013.01); *F04C 25/02* (2013.01); *F16K 15/162* (2021.08);
(Continued)

(58) Field of Classification Search
CPC .. F04C 29/128; F04C 29/126; F04C 18/3441; F04C 25/02; F04C 2220/10; F04C 2240/805; F16K 15/16; F16K 15/162
See application file for complete search history.

(56) References Cited

U.S. PATENT DOCUMENTS 4,901,682 A * 2/1990 Everts ..................... F16K 15/16
                                                            123/73 V
7,918,659 B2 * 4/2011 De Rango ............ F04C 18/3442
                                                            418/270
(Continued)

FOREIGN PATENT DOCUMENTS

CN      1492151 A      4/2004
DE    102 27 772 A1    1/2003
(Continued)

OTHER PUBLICATIONS

English Machine translation of Abstract for JP-03260382-A (Year: 1991).*

*Primary Examiner* — Nathan C Zollinger
(74) *Attorney, Agent, or Firm* — Norman B. Thot

(57) ABSTRACT

An automobile vacuum pump includes a pump chamber with a pump rotor, an outlet chamber, a partition wall separating the pump chamber from the outlet chamber, and an outlet valve in the partition wall. A compressed gas is discharged from the pump chamber into the outlet chamber via the outlet valve. The outlet valve is formed by a valve opening in the partition wall, a valve seat arranged around the valve opening, and a leaf spring provided as a valve body. The leaf spring includes a spring body which includes a fastening site where the spring body is fixed to the partition wall, and a spring-body-side stopper. The spring-body-side stopper is arranged so that a first distance between the spring-body-side stopper and the fastening site is larger than a second distance between the fastening site and an opening (Continued)

edge of the valve opening which is closest to the fastening site.

7 Claims, 3 Drawing Sheets

(51) Int. Cl.
  *F16K 15/16* (2006.01)
  *F04C 18/344* (2006.01)
(52) U.S. Cl.
  CPC ...... *F04C 18/3441* (2013.01); *F04C 2220/10* (2013.01); *F04C 2240/805* (2013.01)

(56) References Cited

U.S. PATENT DOCUMENTS

| | | |
|---|---|---|
| 2004/0136841 A1 | 7/2004 | Takahashi et al. |
| 2008/0199342 A1 | 8/2008 | De Rango et al. |
| 2012/0060683 A1* | 3/2012 | Peters .................. F04C 25/02 91/468 |
| 2015/0211520 A1* | 7/2015 | Otsuka ................ F04C 18/08 418/259 |
| 2016/0047482 A1 | 2/2016 | Kuhnekath |
| 2017/0009770 A1* | 1/2017 | Des ...................... F04C 25/02 |
| 2018/0291900 A1* | 10/2018 | Valkenberg ........... F04C 18/22 |
| 2019/0170141 A1* | 6/2019 | Ott ....................... F04C 25/02 |

FOREIGN PATENT DOCUMENTS

| | | | | |
|---|---|---|---|---|
| EP | 1 953 389 A2 | | 8/2008 | |
| EP | 2 568 180 A1 | | 3/2013 | |
| JP | 03260382 A | * | 11/1991 | |
| JP | 2002-70774 A | | 3/2002 | |
| JP | 2005-226536 A | | 8/2005 | |
| JP | 2012067729 A | * | 4/2012 | ............ F04C 15/068 |
| WO | WO 2006/129333 A1 | | 12/2006 | |
| WO | WO 2008/080492 A1 | | 7/2008 | |
| WO | WO 2010/145633 A2 | | 12/2010 | |
| WO | WO-2010145633 A2 | * | 12/2010 | ............ F04C 27/00 |
| WO | WO 2014/154239 A1 | | 10/2014 | |

\* cited by examiner

MOTOR VEHICLE VACUUM PUMP

CROSS REFERENCE TO PRIOR APPLICATIONS

This application is a U.S. National Phase application under 35 U.S.C. § 371 of International Application No. PCT/EP2015/075365, filed on Nov. 2, 2015. The International Application was published in German on May 11, 2017 as WO 2017/076418 A1 under PCT Article 21(2).

FIELD

The present invention relates to an automobile vacuum pump comprising a pump chamber for compressive rotation of a pump rotor therein, and an outlet chamber into which the compressed gas is discharged from the pump chamber. The vacuum pump comprises a partition wall separating the pump chamber from the outlet chamber, and at least one outlet valve designed as a back-check valve and arranged in the partition wall, the compressed gas being discharged from the pump chamber into the outlet chamber via the outlet valve.

BACKGROUND

An automobile vacuum pump is designed to generate a vacuum of, for example, 100 mbar absolute, in an automobile irrespective of the operating state of an internal combustion engine, the vacuum being required, for example, to operate a pneumatic brake booster and/or other pneumatically operated accessories.

A leaf spring is frequently used as a valve body for the outlet valve in such a vacuum pump due to its simple construction and high reliability, the leaf spring, when in a closed position, being in abutment on a valve seat formed around the outlet opening. Actuation of the outlet valve is performed pneumatically. An undesirable effect in the opening and closing processes is the accompanying noise emission which in the opening process is primarily caused by the expansion of the oil/air mixture.

EP 1 953 389 A2 describes a vacuum pump wherein, for noise reduction, a hole is provided in the leaf spring of the outlet valve to reduce a pressure difference in this region.

DE 102 27 772 A1 describes a further vacuum pump where, for noise reduction, the vacuum pump is formed with a channel near the valve opening, the channel connecting the pump chamber to the outlet chamber so as to slow down the opening and closing movement of the leaf spring and to thereby reduce the pressure difference in this region.

These prior art vacuum pumps have a permanent connection between the pump chamber and the outlet chamber. No absolute leak-tightness of the closed outlet valve therefore exists. This causes a permanent venting of the pump chamber, thereby significantly degrading the efficiency of the pump.

SUMMARY

An aspect of the present invention is to provide a low-noise automobile vacuum pump which has a good efficiency.

In an embodiment, the present invention provides an automobile vacuum pump which includes a pump chamber configured to have a pump rotor rotate therein so as to provide a compressed gas, an outlet chamber configured to have the compressed gas from the pump chamber be discharged therein, a partition wall configured to separate the pump chamber from the outlet chamber, and at least one outlet valve provided as a back-check valve arranged in the partition wall. The compressed gas is discharged from the pump chamber into the outlet chamber via the at least one outlet valve. The at least one outlet valve is formed by a valve opening arranged in the partition wall, a valve seat arranged around the valve opening, and a leaf spring provided as a valve body. The valve opening comprises an opening edge. The leaf spring is configured to move between a closed position of the at least one outlet valve in which the leaf spring rests on the valve seat, and an opened position of the at least one outlet valve in which the leaf spring is spaced from the valve seat. The leaf spring is formed by a spring body which comprises a fastening site where the spring body is fixed to the partition wall, and a spring-body-side stopper. The spring-body-side stopper is arranged so that a first distance between the spring-body-side stopper and the fastening site is larger than a second distance between the fastening site and the opening edge of the valve opening which is closest to the fastening site.

BRIEF DESCRIPTION OF THE DRAWINGS

The present invention is described in greater detail below on the basis of embodiments and of the drawings in which.

DETAILED DESCRIPTION

Figure 1:
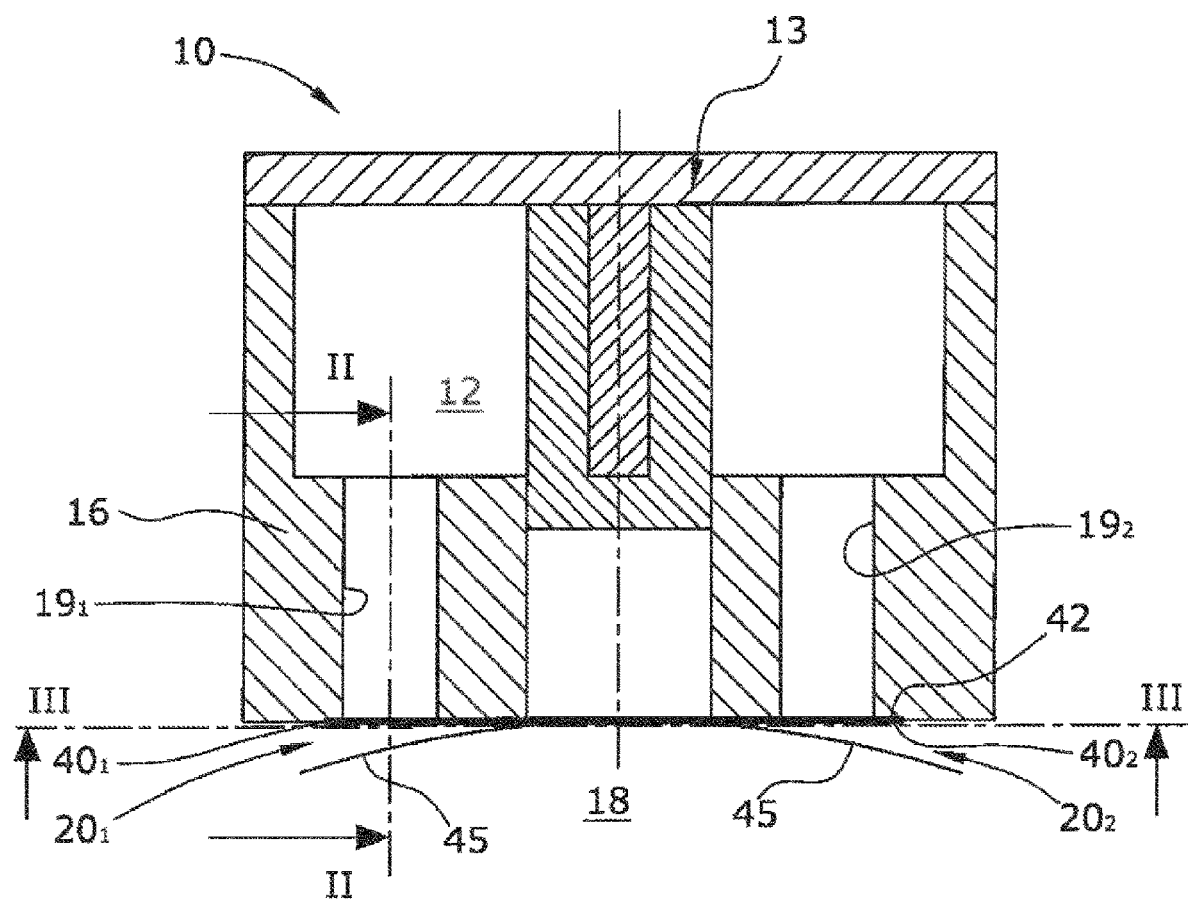
FIG. 1 shows an automobile vacuum pump according to the present invention.

In an embodiment, the automobile vacuum pump includes a spring body which comprises a spring-body-side stopper whose distance to a fastening site of the spring body is larger than a distance between the fastening site and an opening edge of the valve opening that is closest to the fastening site. According to the present invention, the opening edge is provided between the valve opening and a valve seat which, being a part of the housing, forms a support surface for the leaf spring.

The closest opening edge of the valve opening as used herein is to be understood as being that portion of the opening edge which has the smallest distance to the fastening site. As viewed from the fastening site, the spring-body-side stopper is thus arranged behind the portion of the opening edge.

The spring-body-side stopper as used herein is to be understood as being a constructive design of the spring body which mechanically cooperates, for example, with the partition wall, so that a moving direction of the leaf spring oriented in the direction of a valve seat plane is limited. The leaf spring is oriented toward the valve seat in an abutment position, i.e., a position in which the spring-body-side stopper cooperates, for example, with the partition wall.

The leaf spring comprises an overlap with the valve seat. The leaf spring is thereby in abutment on the valve seat in a closed and biased state and within a closed ring so that, when the outlet valve has been closed, the pump chamber is not vented. The efficiency of the pump is thus improved.

A larger lever arm of the stopper toward the fastening site can be provided via the possibility of arranging the spring-body-side stopper behind an opening edge of the valve opening, as viewed from the fastening site of the spring body. It is thereby made possible, in the mounting process, to position and fix the leaf spring on the valve seat in a very exact manner. The resultant overlap between the valve seat and the leaf spring is thus allowed to be reduced because no need exists to provide a larger overlap to compensate for mounting inaccuracies. By the very precise mounting achieved, the leaf spring can be in abutment on the valve seat with a reliable closure and sealing effect also when the overlap is small.

When operating an oil-lubricated vacuum pump, oil will be discharged from the valve opening together with the gas, wherein this oil will also become deposited on the valve seat and the leaf spring. This oil generates a high adhesion force between the valve seat and the leaf spring at the time of opening. A high adhesion force has the disadvantage that the leaf spring will open only at higher outlet pressures. Higher outlet pressures will cause an increased expansion of the oil/gas mixture at the valve outlet, resulting in a higher noise emission. A small overlap thus has the advantage that the adhesion force between the valve seat and the leaf spring will also be smaller. Due to the reduced adhesion force between the leaf spring and the valve seat, the leaf spring will therefore already open at lower outlet pressures, thereby reducing noise emissions.

In an embodiment of the present invention, the spring body can, for example, form a bracket which is provided at a radial distance to the leaf spring and which comprises the spring-body-side stopper. A bracket as used herein is to be understood as a constructive element which surrounds the leaf spring at a radial distance. A radial direction as used herein is to be understood a direction which extends, in the plane of the valve seat, vertically to a peripheral direction of the leaf spring. Such a design offers the advantage that the mechanical stopper can be provided independently from the leaf spring. The leaf spring will thereby not be hindered in its opening movement.

In an embodiment of the present invention, the spring-body-side stopper can, for example, be provided on the bracket on a longitudinal end of the spring body opposite to the fastening site. The spring-body-side stopper thus has a maximum possible distance to the fastening site so that the lever arm of the spring-body-side stopper toward the fastening site is at a maximum. This offers the advantage that the leaf spring can be adjusted on the valve seat very precisely.

In an embodiment of the present invention, the spring-body-side stopper can, for example, be a nose. A nose as used herein is to be understood as a constructional element which projects from the spring body.

In an embodiment of the present invention, the spring body can, for example, be fixed to the partition wall by a screw, and the spring-body-side stopper can, for example, be arranged so that a movement direction of the spring body in the direction of a screw-on rotational direction is limited. This has the advantage that the mechanical stopper will be brought into an abutment position when the spring body is being screwed into place.

In an embodiment of the present invention, the spring body can, for example, comprise, at the fastening site of the spring body, a fastening bore which together with a fastening device forms an additional stopper arrangement. Further movement directions of the spring body during assembly can thus be limited, whereby the leaf spring is positionable on the valve seat in a still more precise manner.

In an embodiment of the present invention, the spring body can, for example, form a spring-body-side stopper portion which, acting as an additional stopper arrangement, mechanically cooperates with a partition-wall-side stopper portion of the partition wall so that a movement direction in transverse direction of the leaf spring is limited. The spring-body-side stopper portion is a region of the spring body which mechanically contacts the partition-wall-side stopper portion of the partition wall. Further movement directions of the spring body can thus be limited, whereby the leaf spring is positionable on the valve seat in a very precise manner.

In an embodiment of the present invention, two outlet valves can, for example, be formed in the partition wall. The first outlet valve forms a fluid outlet during a forward run, and the second outlet valve forms a fluid outlet during a reverse run of the rotor. This has the advantage that the automobile vacuum pump can be operated in both running directions of the rotor. The two leaf springs of the outlet valves are formed by the common spring body in this arrangement. The number of component parts of the vacuum pump is thereby reduced so that the assembly process is facilitated and a mix-up between the leaf springs is excluded.

Further details and advantages of the present invention are evident from the following description of an exemplary embodiment under reference to the drawings.

FIG. 1 shows an automobile vacuum pump 10 according to the present invention. The automobile vacuum pump 10 forms a pump chamber 12 in which a gas is condensed by a rotating pump rotor 13. A partition wall 16 separates the pump chamber 12 from an outlet chamber 18. In the partition wall 16, there are formed a kidney-shaped forward-run valve opening $19_1$ and a kidney-shaped reverse-run valve opening $19_2$. For fluidic connection of pump chamber 12 and outlet chamber 18, the automobile vacuum pump 10 comprises a forward-run outlet valve $20_1$ formed as a back-check valve and a reverse-run outlet valve $20_2$ formed as a back-check valve. Said outlet valves $20_1$, $20_2$ comprise, for use as valve bodies, kidney-shaped leaf springs $40_1$, $40_2$ which, when in a closed state, close the valve openings $19_1$, $19_2$.

Figure 2:
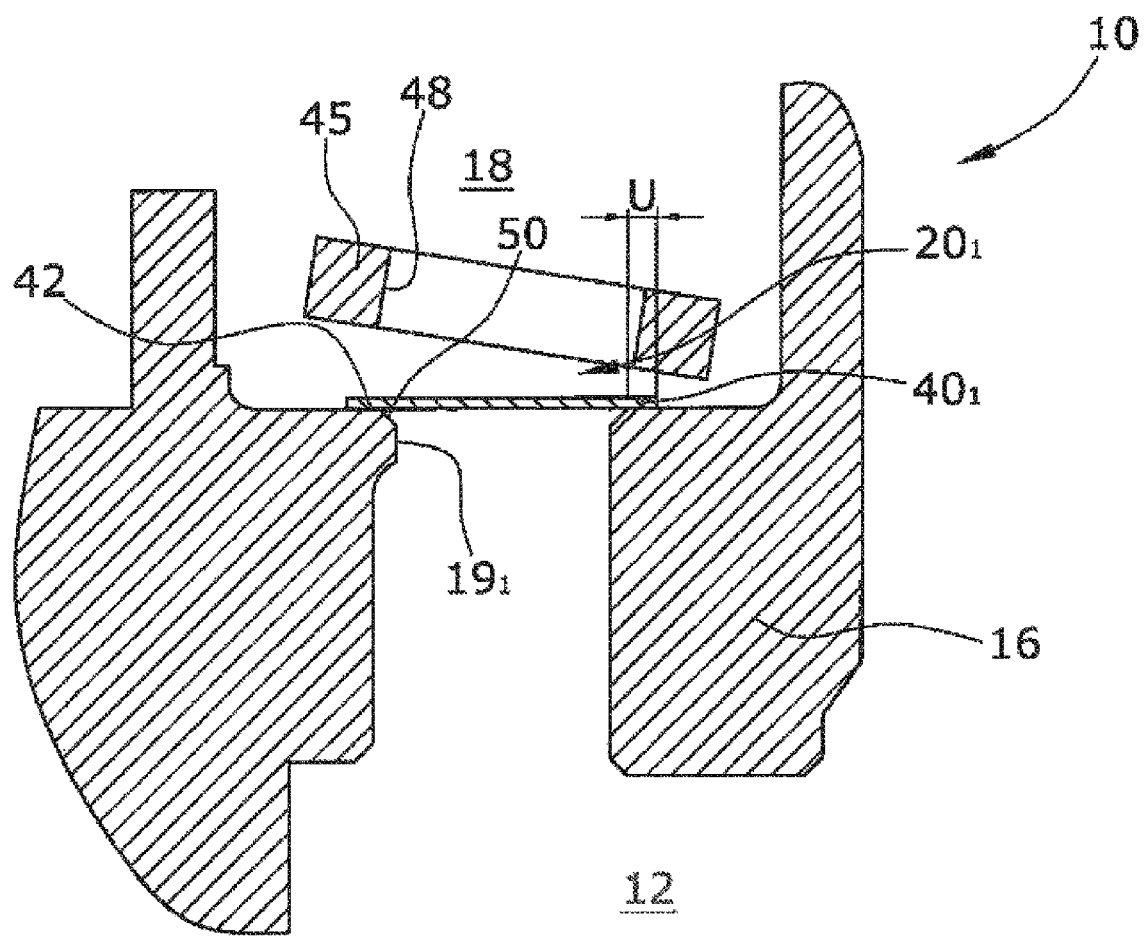
FIG. 2 shows a sectional view of the outlet valve of the automobile vacuum pump according to FIG. 1.

FIG. 2 shows a sectional view of the forward-run outlet valve $20_1$. The forward-run outlet valve $20_1$ is formed by the kidney-shaped forward-run leaf spring $40_1$, a valve seat 42 formed by the pump housing, and the kidney-shaped forward-run valve opening $19_1$ connecting pump chamber 12 and outlet chamber 18. The forward-run valve opening $19_1$ is closed by the forward-run leaf spring $40_1$, as is shown in FIG. 2. In the closed position, the forward-run leaf spring $40_1$ is arranged in sealing abutment on valve seat 42 with an overlap U. In an opening position, the forward-run leaf spring $40_1$ is bent so that it is spaced from valve seat 42.

In the above arrangement, the opening movement of the forward-run leaf spring $40_1$ is limited by a valve limiter 45 provided in the opening direction of the forward-run leaf spring $40_1$ and at a distance to valve seat 42. Valve limiter 45 comprises kidney-shaped valve limiting openings 48 which are provided in the outflow direction of the fluid above the leaf springs $40_1$, $40_2$ and which have the leaf springs $40_1$, $40_2$ laterally extending beyond them. These kidney-shaped valve limiting openings 48 allow for easier detachment of the leaf springs $40_1$, $40_2$ from the valve limiter 45 in a closing process. For keeping the overlap U as small as possible, and thus reducing noise emissions, a chamfer 50 is provided on an inner peripheral surface of the valve openings $19_1$, $19_2$.

Figure 3:
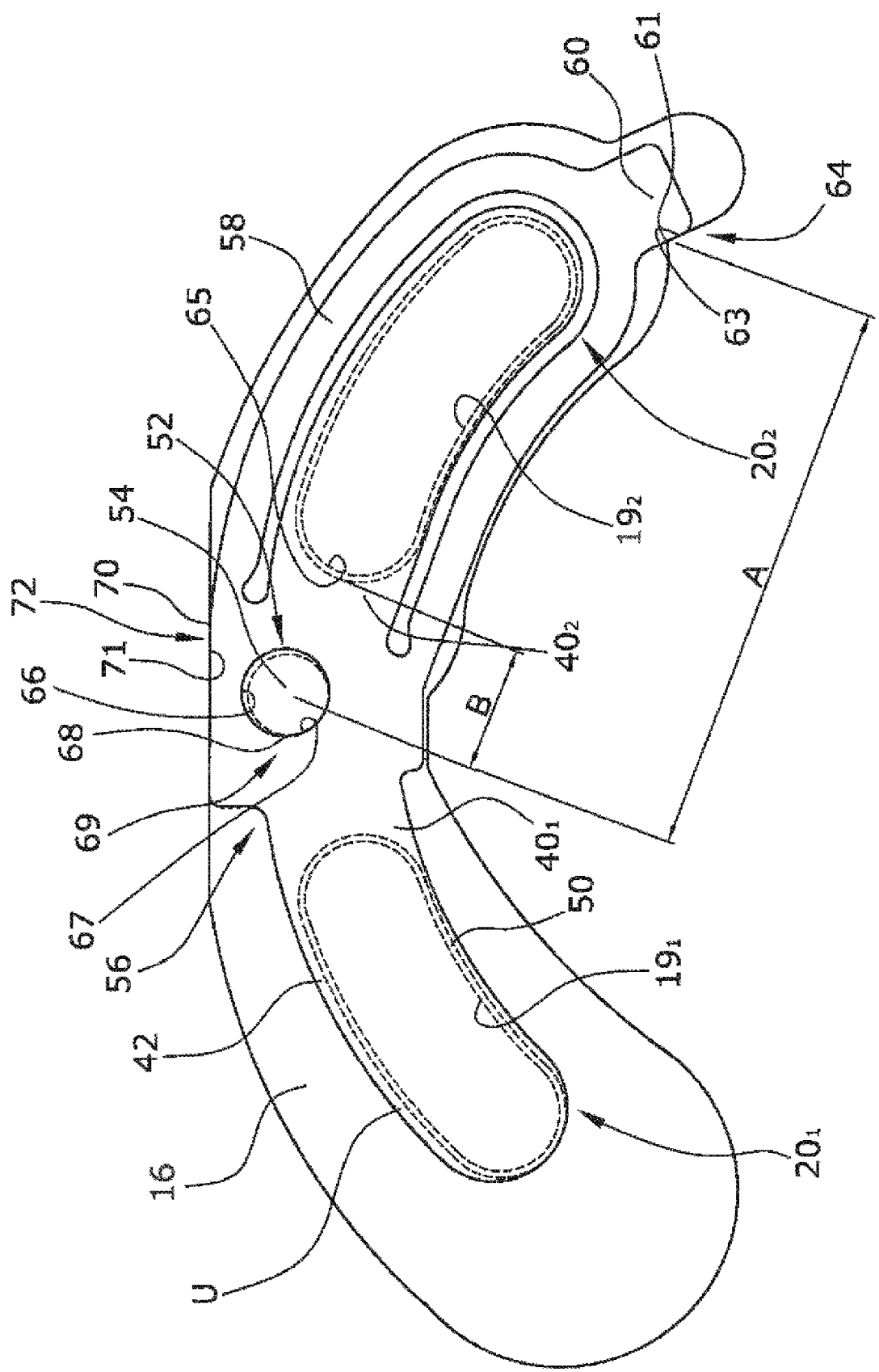
FIG. 3 shows a plan view of the outlet valve of the automobile vacuum pump according to FIG. 1.

FIG. 3 shows a plan view of the forward-run outlet valve $20_1$ and the reverse-run outlet valve $20_2$ according to FIG. 1 without the valve limiter 45. The leaf springs $40_1$, $40_2$ forming the valve bodies of the outlet valves $20_1$, $20_2$ are provided in the outflow direction of the fluid, on both sides of a fastening site 52. At this fastening site 52, a fastening device 54 fixes a sole common spring body 56 which forms the kidney-shaped forward-run leaf spring 40₁ and the kidney-shaped reverse-run leaf spring 40₂.

The sole common spring body 56 forms a bracket 58 which is provided at a radial distance to the reverse-run leaf spring 40₂ and which surrounds the reverse-run leaf spring 40₂. This bracket 58 allows for an opening movement of the reverse-run leaf spring 40₂ without performing an opening movement itself. On a longitudinal side of bracket 58 that is arranged at a maximum distance from a fastening site 52, a nose 60 is formed which forms a spring-body-side stopper 61. The spring-body-side stopper 61 mechanically cooperates with a partition-wall-side stopper 63 of the partition wall 16. The spring-body-side stopper 61 and the partition-wall-side stopper 63 together form a first stopper arrangement 64 which is effective to prevent a twisting of spring body 56 during assembly. A distance A of the spring-body-side stopper 61 to the fastening site 52 is larger than a distance B between the fastening site 52 and an opening edge 65 of the reverse-run valve opening 19₂ that is closest to the fastening site 52.

The spring body 56 defines a fastening bore 66 at the fastening site 52 of spring body 56, the fastening bore 66 forming a spring-body-side fastening stopper 67. The spring-body-side fastening stopper 67 mechanically cooperates with the fastening device 54 which forms a fastening-device side stopper 68. The spring-body-side fastening stopper 67 and the fastening-device side stopper 68 together form a second stopper arrangement 69. This second stopper arrangement 69 prevents a displacement of spring body 56 in a longitudinal direction of spring body 56.

In a region adjacent to fastening bore 66, the spring body 56 forms a spring-body-side stopper portion 70 which cooperates with a partition-wall-side stopper portion 71 as a third stopper arrangement 72. This third stopper arrangement 72 prevents a displacement of spring body 56 in a transverse direction to spring body 56.

These three stopper arrangements 64, 69, 72 provide that the leaf spring 40₁, 40₂ can be positioned on valve seat 42 with high precision so that, even if minimum mounting tolerances should be selected, a sufficient and sealing overlap U between valve seat 42 and leaf spring 40₁, 40₂ can always be provided.

The present invention is not limited to embodiments described herein; reference should be had to the appended claims.

LIST OF REFERENCE NUMERALS 10 automobile vacuum pump
12 pump chamber
13 pump rotor
16 partition wall
18 outlet chamber
$19_1$ forward-run valve opening
$19_2$ reverse-run valve opening
$20_1$ forward-run outlet valve
$20_2$ reverse-run outlet valve
$40_1$ forward-run leaf spring
$40_2$ reverse-run leaf spring
42 valve seat
45 valve limiter
48 valve limiting opening
50 chamfer
52 fastening site
54 fastening device
56 spring body
58 bracket
60 nose
61 spring-body-side stopper
63 partition-wall-side stopper
64 first stopper arrangement
65 opening edge
66 fastening bore
67 spring-body-side fastening stopper
68 fastening-device-side stopper
69 second stopper arrangement
70 spring-body-side stopper portion
71 partition-wall-side stopper portion
72 third stopper arrangement
A distance
B distance
U overlap

What is claimed is:

1. An automobile vacuum pump comprising:
   a pump chamber configured to have a pump rotor rotate therein so as to provide a compressed gas;
   an outlet chamber configured to have the compressed gas from the pump chamber be discharged therein;
   a partition wall configured to separate the pump chamber from the outlet chamber; and
   at least one outlet valve provided as a back-check valve arranged in the partition wall, the compressed gas being discharged from the pump chamber into the outlet chamber via the at least one outlet valve, the at least one outlet valve being formed by a valve opening arranged in the partition wall, a valve seat arranged around the valve opening, and a spring body which comprises a leaf spring having an outer perimeter which is provided as a valve body,
   wherein,
   the valve opening comprises an opening edge,
   the leaf spring is configured to move between a closed position of the at least one outlet valve in which the leaf spring rests on the valve seat, and an opened position of the at least one outlet valve in which the leaf spring is spaced from the valve seat,
   the spring body further comprises a fastening site where the spring body is fixed to the partition wall, and a spring-body-side stopper, and
   the spring-body-side stopper is arranged so that a first distance between the spring-body-side stopper and the fastening site is larger than a second distance between the fastening site and the opening edge of the valve opening which is closest to the fastening site,
   wherein
   the spring body further comprises a bracket surrounding the outer perimeter of the leaf spring and arranged at a radial distance to the leaf spring,
   the bracket comprises the spring-body-side stopper,
   the partition wall comprises a partition-wall-side stopper, and
   the spring-body-side stopper cooperates with the partition-wall-side stopper of the partition wall to form a first stopper arrangement.

2. The automobile vacuum pump as recited in claim 1, wherein the spring-body-side stopper is arranged on a longitudinal end of the bracket which is opposite to the fastening site.

3. The automobile vacuum pump as recited in claim 1, wherein the spring-body-side stopper is formed by a nose.

4. The automobile vacuum pump as recited in claim 1, further comprising:

a fastening device comprising a screw, the fastening device being configured to fix the spring body to the partition wall, wherein, the spring-body-side stopper is configured to delimit a movement direction of the spring body in a direction of a screw-on rotational direction of the fastening device.

5. The automobile vacuum pump as recited in claim 4, wherein, the spring body further comprises a fastening bore arranged at the fastening site, and the fastening bore and the fastening device form a second stopper arrangement.

6. The automobile vacuum pump as recited in claim 5, wherein;

the spring body is configured to form a spring-body-side stopper portion which is configured to act as a third stopper arrangement and to cooperate with the partition-wall-side stopper portion of the partition wall so as to limit a movement direction in a transverse direction to the at least one leaf spring.

7. The automobile vacuum pump as recited in claim 1, wherein, two outlet valves are formed in the partition wall, and each leaf spring of the two outlet valves are formed by the spring body.

* * * * *